(12) United States Patent
Noguchi

(10) Patent No.: US 10,081,230 B2
(45) Date of Patent: Sep. 25, 2018

(54) DOOR SASH

(71) Applicant: Sankei Giken Kogyo Co., Ltd., Isesaki (JP)

(72) Inventor: Ryota Noguchi, Isesaki (JP)

(73) Assignee: Sankei Giken Kogyo Co., Ltd., Isesaki (JP)

( * ) Notice: Subject to any disclaimer, the term of this patent is extended or adjusted under 35 U.S.C. 154(b) by 0 days.

(21) Appl. No.: 15/508,241

(22) PCT Filed: Jul. 7, 2015

(86) PCT No.: PCT/JP2015/069538
§ 371 (c)(1),
(2) Date: Mar. 2, 2017

(87) PCT Pub. No.: WO2016/035446
PCT Pub. Date: Mar. 10, 2016

(65) Prior Publication Data
US 2017/0305241 A1 Oct. 26, 2017

(30) Foreign Application Priority Data
Sep. 4, 2014 (JP) ................................ 2014-180127

(51) Int. Cl.
*B60J 5/04* (2006.01)
*B60J 10/24* (2016.01)
(Continued)

(52) U.S. Cl.
CPC ............ *B60J 5/0402* (2013.01); *B60J 10/24* (2016.02); *B60J 10/32* (2016.02); *B60J 10/86* (2016.02)

(58) Field of Classification Search
CPC ........... B60J 5/0402; B60J 10/32; B60J 10/24
(Continued)

(56) References Cited

U.S. PATENT DOCUMENTS 4,457,111 A * 7/1984 Koike .................... B60J 10/248
296/146.3
5,347,758 A * 9/1994 Yamane .................. B60J 10/24
49/484.1
(Continued)

FOREIGN PATENT DOCUMENTS

JP 08-104139 A 4/1996
JP 2010-012892 A 1/2010
(Continued)

OTHER PUBLICATIONS

International Search Report dated Sep. 15, 2015, issued for PCT/JP2015/069538.
(Continued)

*Primary Examiner* — Jerry E Redman
(74) *Attorney, Agent, or Firm* — Locke Lord LLP

(57) ABSTRACT

A door sash which is formed by roll-forming from a single plate material and in which a weather strip is fitted includes: an overlapping section formed by making the plate materials overlap each other; a tubular section formed to extend from a car-interior-side end portion of the overlapping section; and flange sections and respectively formed to protrude from a car-exterior-side end portion of the overlapping section to both sides, in which a periphery of an end portion of the plate material extending from the tubular section is formed so as to come into contact along a plate material forming the overlapping section on the side on which the weather strip is fitted, and the vicinity of an end portion of the plate material forming the overlapping section, in which deformation has occurred during the roll-forming, protrudes to the inside of the tubular section.

8 Claims, 8 Drawing Sheets

(51) Int. Cl.
  *B60J 10/32*  (2016.01)
  *B60J 10/86*  (2016.01)
(58) Field of Classification Search
  USPC .......................................................... 49/502
  See application file for complete search history.

(56) References Cited

U.S. PATENT DOCUMENTS

| | | | | |
|---|---|---|---|---|
| 5,983,571 | A * | 11/1999 | Takeda | B21D 5/083 49/502 |
| 5,992,021 | A * | 11/1999 | Takeda | B60J 5/0402 29/897.2 |
| 7,762,021 | B2 * | 7/2010 | Fujiwara | B60J 5/0402 29/509 |
| 9,085,220 | B2 * | 7/2015 | Yoshihara | B60J 5/0402 |
| 9,764,625 | B2 * | 9/2017 | Endo | B60J 5/0402 |
| 2002/0027378 | A1 * | 3/2002 | Nozaki | B60J 10/24 296/146.9 |
| 2002/0108313 | A1 * | 8/2002 | Nozaki | B60J 5/0402 49/441 |
| 2006/0162258 | A1 * | 7/2006 | Yamashita | B60J 10/24 49/495.1 |
| 2007/0262607 | A1 * | 11/2007 | Saito | B60J 5/0402 296/146.2 |
| 2007/0262608 | A1 * | 11/2007 | Saito | B60J 1/17 296/146.7 |
| 2008/0178531 | A1 * | 7/2008 | Takeuchi | B60J 1/17 49/475.1 |
| 2009/0115220 | A1 * | 5/2009 | Takeuchi | B60J 5/0402 296/146.6 |
| 2009/0195013 | A1 * | 8/2009 | Suzuki | B60J 5/0402 296/146.5 |
| 2010/0115851 | A1 * | 5/2010 | Nakao | B60J 5/0402 49/502 |
| 2011/0099911 | A1 * | 5/2011 | Ellis | B60J 5/0402 49/493.1 |
| 2011/0099912 | A1 * | 5/2011 | Ohtake | B60J 5/0402 49/502 |
| 2014/0059942 | A1 * | 3/2014 | Goto | E06B 9/42 49/502 |
| 2014/0117707 | A1 * | 5/2014 | Yamada | B21D 19/08 296/146.9 |
| 2014/0246878 | A1 * | 9/2014 | Shimizu | B60J 5/0402 296/146.2 |
| 2017/0305246 | A1 * | 10/2017 | Noguchi | B60J 10/76 |

FOREIGN PATENT DOCUMENTS

| | | | | |
|---|---|---|---|---|
| JP | 2010-247771 A | | 11/2010 | |
| KR | 101518908 B1 * | | 5/2015 | ............ B60J 5/0469 |
| WO | WO-2014096934 A2 * | | 6/2014 | ............ B60J 5/0402 |
| WO | 2015/049902 A1 | | 4/2015 | |
| WO | 2015/049960 A1 | | 4/2015 | |
| WO | WO-2015049902 A1 * | | 4/2015 | ............ B60R 13/04 |
| WO | WO-2015049960 A1 * | | 4/2015 | ............ B60R 13/04 |

OTHER PUBLICATIONS

Office Action dated May 31, 2017, issued for the Japanese patent application No. 2014-180127 and a partial English translation thereof.

* cited by examiner

[Fig.1]
(a)
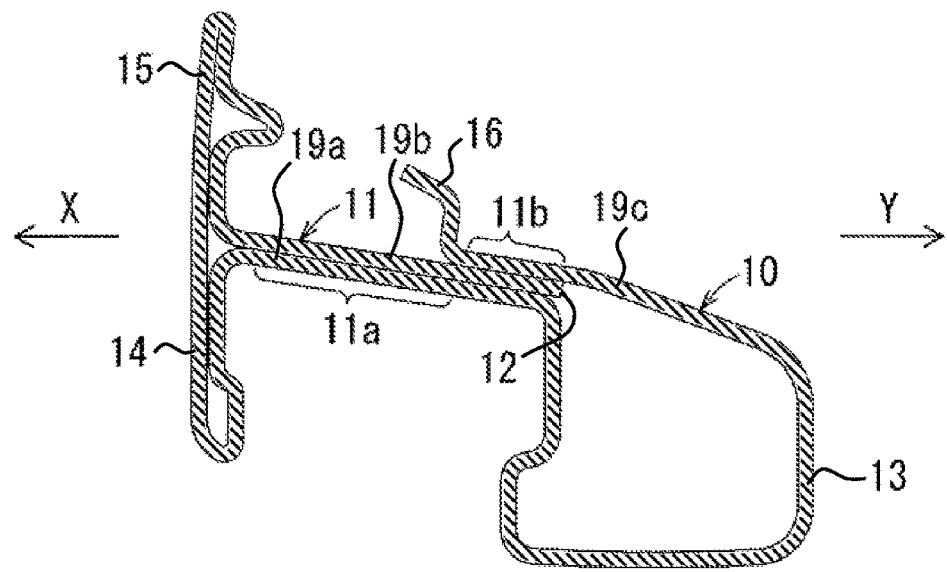
(b)
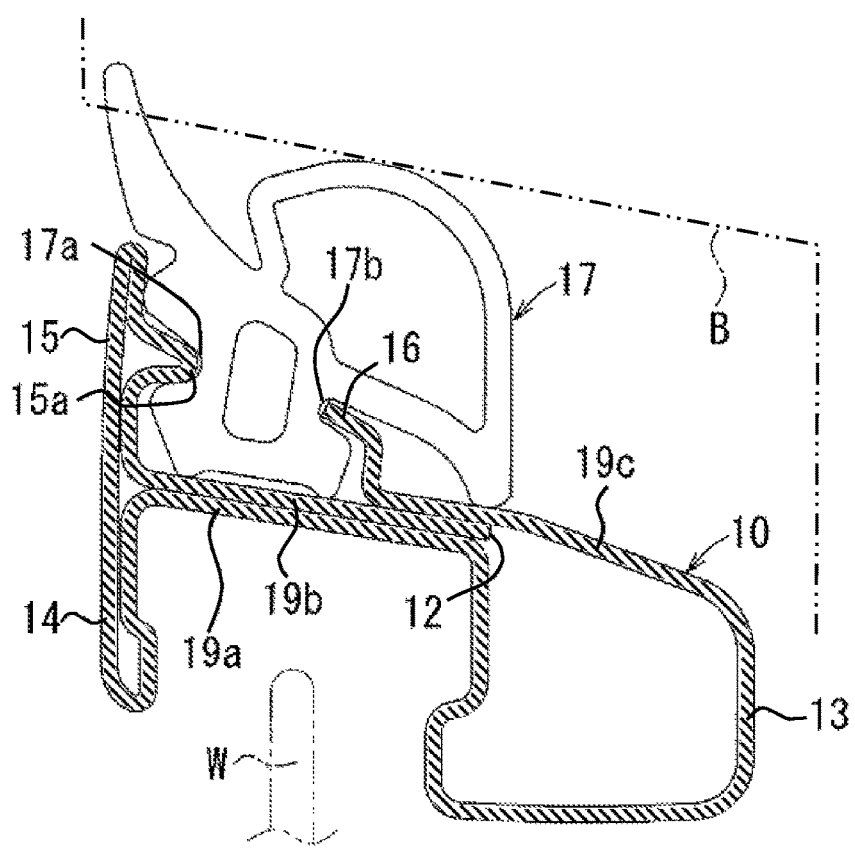

[Fig.2]
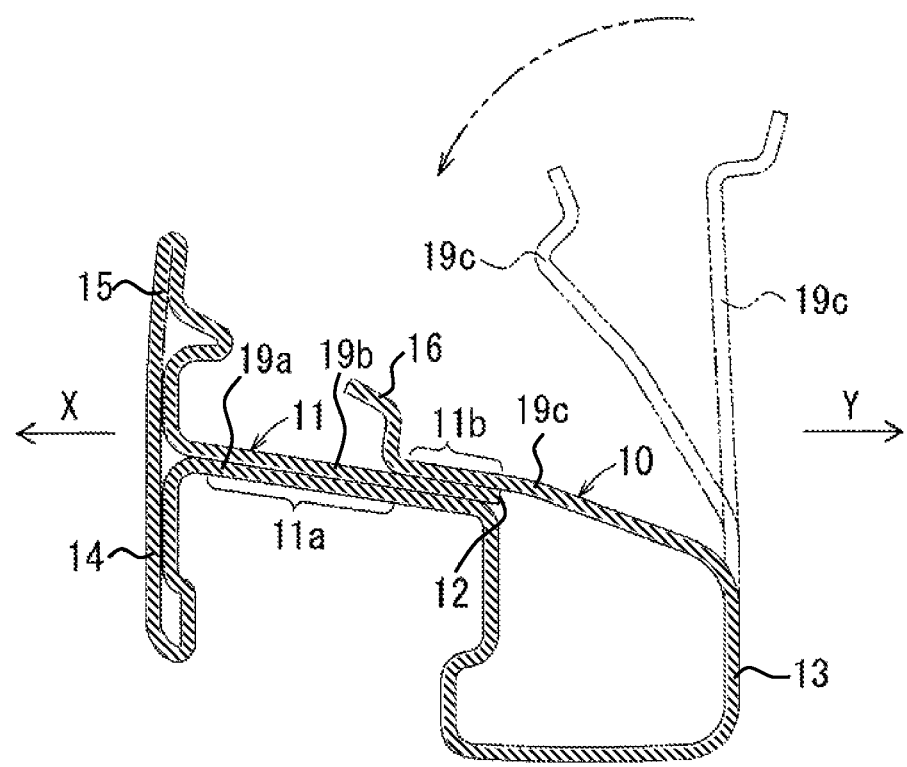

[Fig.3]
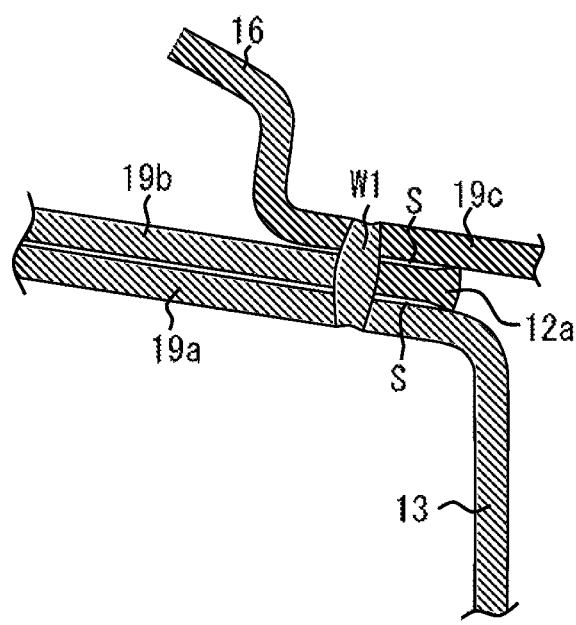

[Fig.4]
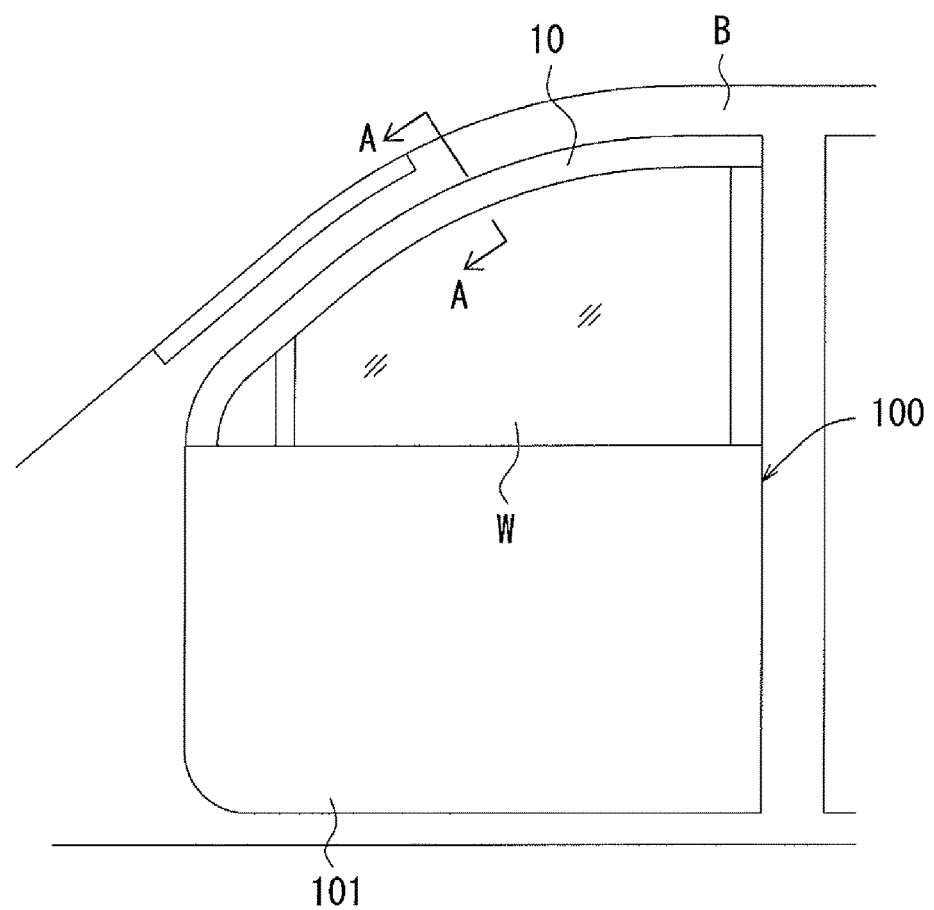

[Fig.5]
(a)
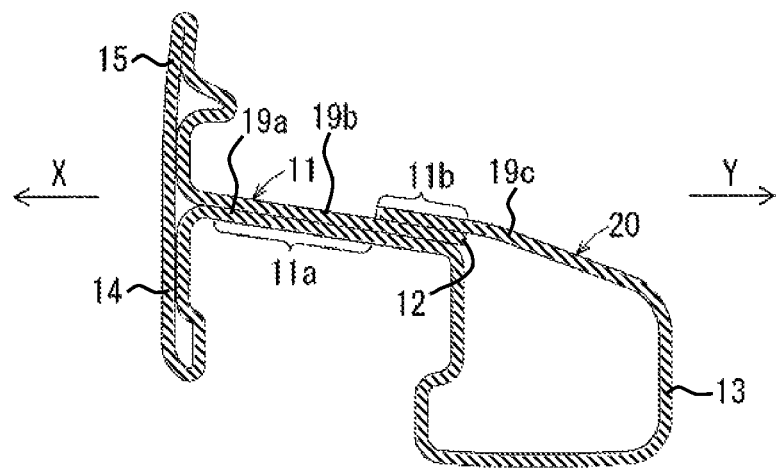
(b)
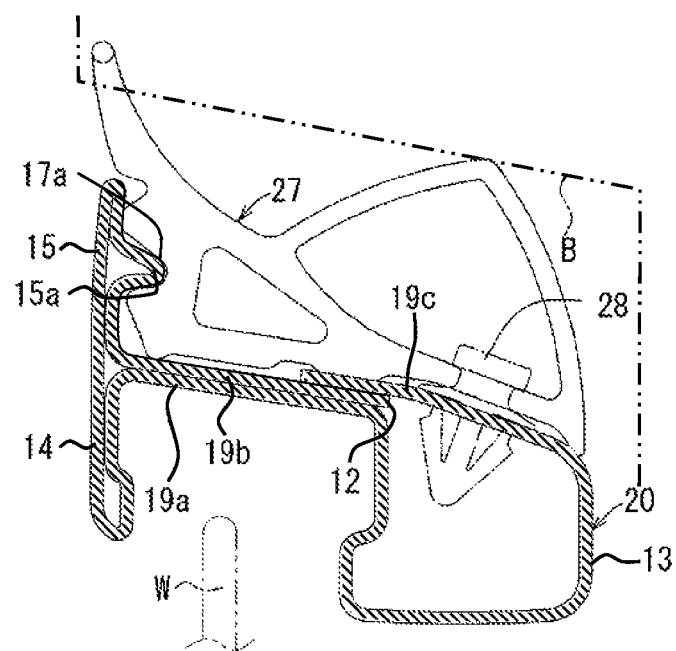

[Fig.6]
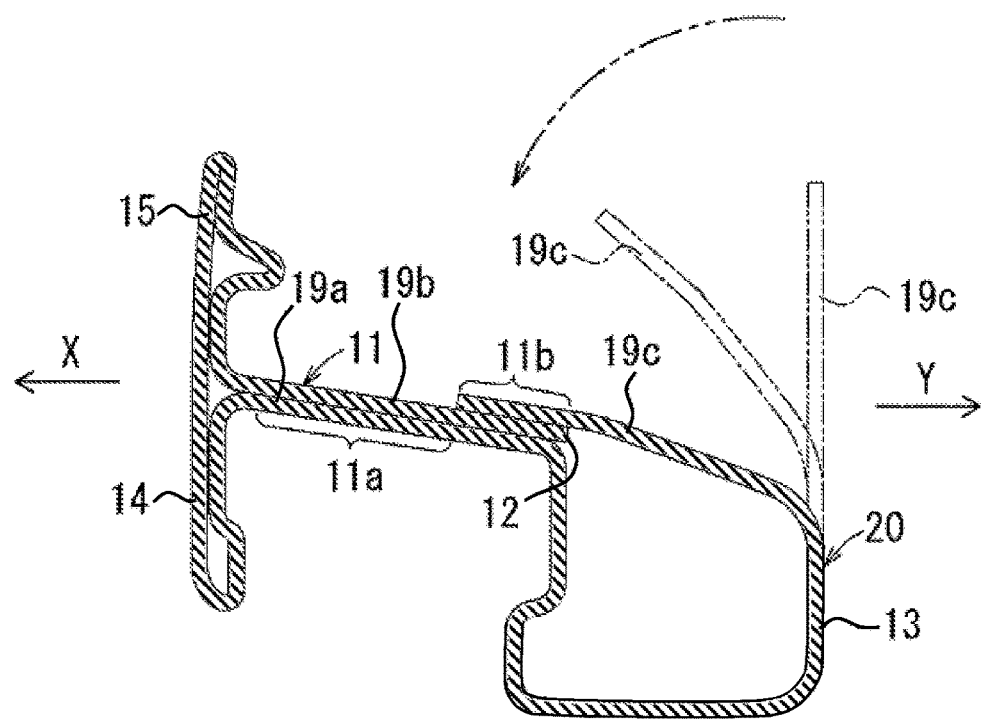

[Fig.7]
(a)
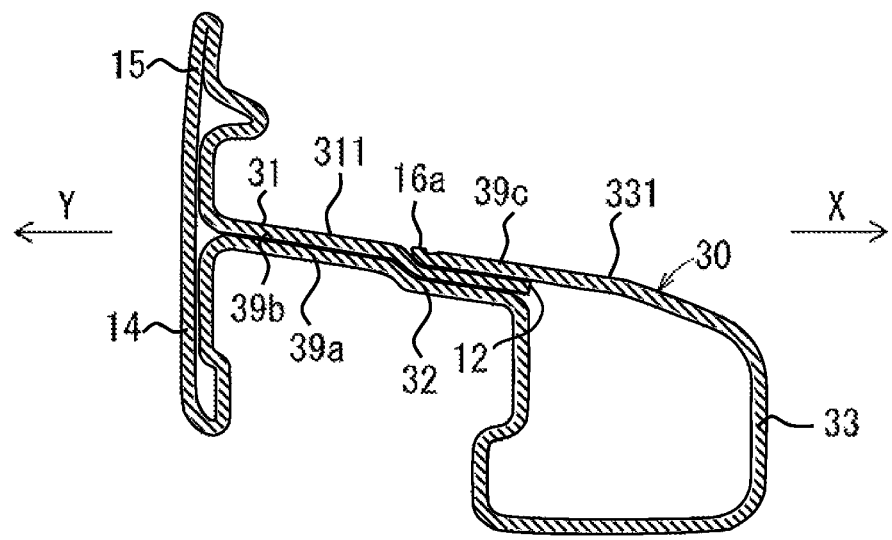
(b)
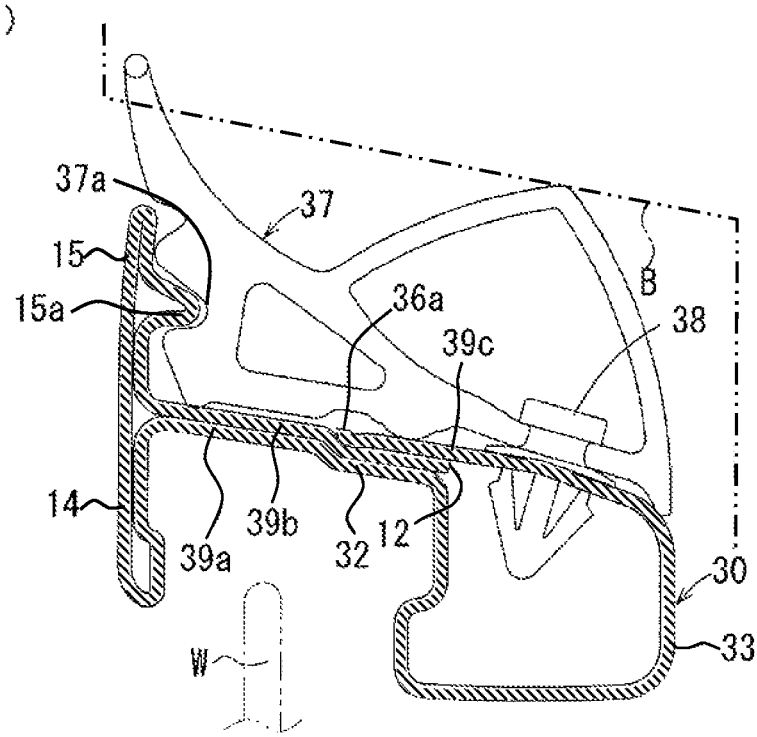

[Fig.8]
(a) Prior Art
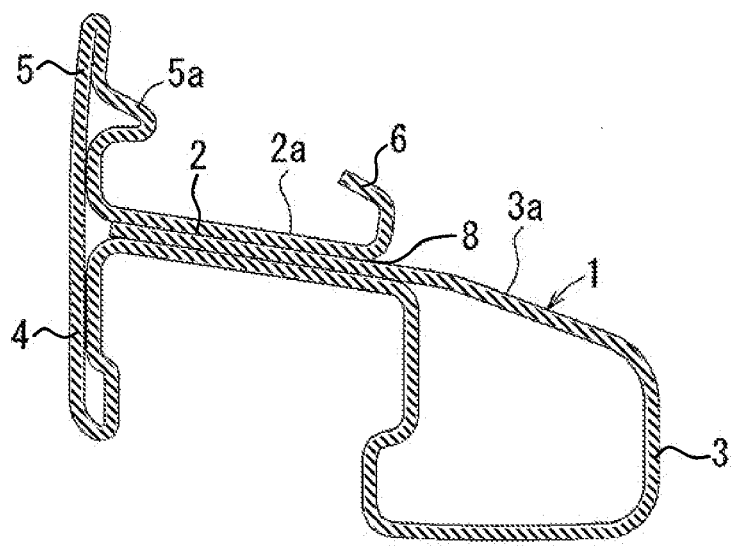
(b) Prior Art
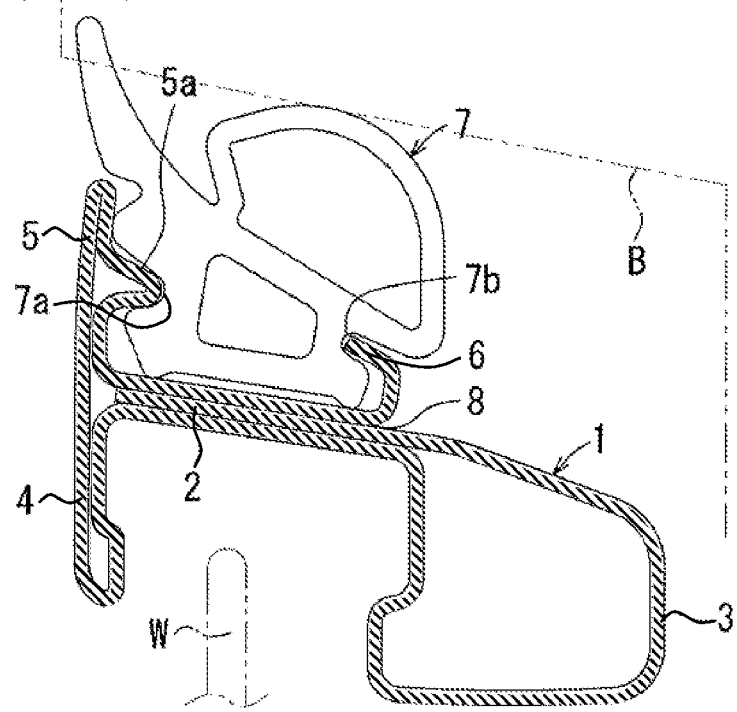

DOOR SASH

CROSS REFERENCE TO RELATED APPLICATIONS

This application is related to co-pending application: "DOOR SASH AND METHOD FOR MANUFACTURING SAME" filed even date herewith in the name of Ryota Noguchi as a national phase entry of PCT/JP2015/069537, which application is assigned to the assignee of the present application and is incorporated by reference herein.

TECHNICAL FIELD

The present invention relates to a door sash which is used for a window frame or the like of a door of an automobile.

BACKGROUND ART

A door sash which is used for a window frame or the like of a door of an automobile is generally provided to be roll-formed into the shape shown in FIG. 8 from a plate material which is a single metal strip. A door sash 1 shown in FIG. 8 is configured of an overlapping section 2 in which plate materials are overlapped each other and welded to each other along a longitudinal direction, a tubular section 3 formed at one end portion of the overlapping section 2 and having a substantially D-shape when viewed in a cross section, flange sections 4 and 5 respectively formed to protrude from the other end portion of the overlapping section 2 to both sides, and a holder 6 which is provided on the side opposite to the tubular section 3 with respect to the overlapping section 2 and formed by curving an end portion of the plate material into a substantially semicircular shape.

Further, a glass channel (not shown) is fitted between the tubular section 3 and the flange section 4 protruding downward in FIG. 8, that is, toward a window glass W side. On the other hand, a weather strip 7 is fitted between the holder 6 and the flange section 5 protruding upward in FIG. 8, that is, toward a vehicle main body B side. When the weather strip 7 is fitted, a projection portion 5a of the flange section is fitted into a recess portion 7a of the weather strip 7 and the holder 6 is fitted into a recess portion 7b of the weather strip 7. PTL 1 discloses the same type of door sash.

CITATION LIST

Patent Literature

[PTL 1] JP-A-8-104139

SUMMARY OF INVENTION

Technical Problem

However, in the door sash 1 shown in FIG. 8, a gap 8 is formed between a part where the plate materials of the overlapping section 2 doubly overlap each other and the holder 6. The gap 8 is a portion which is exposed to the outside, and therefore, water tends to stagnate in the gap 8, and the water penetrates between the plate materials configuring the overlapping section 2 due to capillarity, thereby causing the occurrence of rust. In order to prevent the occurrence of such rust, it is necessary to seal the gap 8 by applying a seal material to the gap 8 along the longitudinal direction of the door sash 1. However, since a step of applying the seal material is added, the effectiveness of a manufacturing process is impeded, and since the gap 8 is a portion to which a coating material does not easily adheres, labor is required to reliably apply the seal material.

The present invention is proposed in consideration of the above problem and provides a door sash in which the occurrence of rust can be prevented and the close contact between welded surfaces is high.

Solution to Problem

In order to solve the above problem, according to an aspect of the present invention, there is provided a door sash which is formed by roll-forming from a single plate material and in which a weather strip is fitted, including: an overlapping section formed by making the plate materials overlap each other; a tubular section formed to extend from a car-interior-side end portion of the overlapping section; and flange sections respectively formed to protrude from a car-exterior-side end portion of the overlapping section to both sides, in which a periphery of an end portion of the plate material extending from the tubular section is formed so as to come into contact along the plate material forming the overlapping section on the side on which the weather strip is fitted, and the vicinity of an end portion of the plate material forming the overlapping section, in which deformation has occurred during the roll-forming, protrudes to the inside of the tubular section.

With this configuration, it is possible to prevent the occurrence of rust and improve the close contact between welded surfaces in the overlapping section, which are formed by welding of the overlapping section by laser-welding or the like.

Further, in the door sash according to the above aspect of the present invention, the vicinity of the end portion of the plate material does not protrude further toward the inside of the tubular section than an inner surface of the plate material of the tubular section, which forms a corner portion along with the overlapping section.

With this configuration, it is possible to reduce the weight of the entire door sash while securing the close contact between the welded surfaces in the overlapping section.

Further, in the door sash according to the above aspect of the present invention, the overlapping section is welded at a place close to a center of gravity of a cross section orthogonal to a longitudinal direction of the door sash.

With this configuration, bending work for forming the curved shape of the door sash becomes easy and the accuracy of the bending work is improved.

Further, the door sash according to the above aspect of the present invention further includes: a stepped section which extends from a car-interior-side end portion of the overlapping section and is bent toward the side on which a window glass is disposed, such that a step is formed, in which an end portion of the plate material is formed at a position where the end portion does not protrude further toward the side on which the weather strip is fitted than a surface of the overlapping section and a surface of the tubular section on the side on which the weather strip is fitted.

With this configuration, it is possible to improve close contact with the weather strip.

Advantageous Effects of Invention

According to the door sash according to the present invention, it is possible to prevent the occurrence of rust and improve the close contact between the welded surfaces in the overlapping section, which are formed by welding of the overlapping section by laser-welding or the like.

BRIEF DESCRIPTION OF DRAWINGS

FIG. 1(a) is a cross-sectional view of a door sash according to a first embodiment of the present invention, and FIG. 1(b) is a cross-sectional view showing a state where a weather strip is mounted on the door sash shown in FIG. 1(a).

FIG. 2 is an explanatory diagram for describing a step of bending a plate material on the side configuring a tubular section of the first embodiment, and superimposing it on an overlapping section.

FIG. 3 is a schematic diagram showing a state of a welded surface in a case where the vicinity of an end portion of a plate material forming the overlapping section, in which deformation has occurred during roll-forming, does not protrude to the inside of the tubular section.

FIG. 4 is a side view showing an example of a vehicle door with the door sash according to the present invention applied thereto.

FIG. 5(a) is a cross-sectional view of a door sash according to a second embodiment of the present invention, and FIG. 5(b) is a cross-sectional view showing a state where a weather strip is mounted on the door sash shown in FIG. 5(a).

FIG. 6 is an explanatory diagram for describing a step of bending a plate material on the side configuring a tubular section of the second embodiment, and superimposing it on an overlapping section.

FIG. 7(a) is a cross-sectional view of a door sash according to a modification example of the present invention, and FIG. 7(b) is a cross-sectional view showing a state where a weather strip is mounted on the door sash shown in FIG. 7(a).

FIG. 8(a) is a cross-sectional view of a door sash according to an example of the related art, and FIG. 8(b) is a cross-sectional view showing a state where a weather strip is mounted on the door sash shown in FIG. 8(a).

DESCRIPTION OF EMBODIMENTS

[Configuration of Door Sash of First Embodiment]

Hereinafter, a door sash according to a first embodiment of the present invention will be described in detail based on the accompanying drawings. FIG. 1(a) is a cross-sectional view of the door sash according to the first embodiment of the present invention, and FIG. 1(b) is a cross-sectional view showing a state where a weather strip is mounted on the door sash shown in FIG. 1(a).

A door sash 10 of the first embodiment configures a vehicle door 100 of an automobile, as shown in FIG. 4. The vehicle door 100 opens and closes a door opening of a vehicle main body B and has a door main body 101, and the door sash 10 which forms an opening, in which a window glass W moves up and down, in an upper part of the door main body 101. FIG. 1 shows a cross-sectional shape in line A-A of FIG. 4.

The door sash 10 of the first embodiment is the door sash 10 which is mounted on, for example, an automobile, and is formed by roll-forming a metal strip which is a single plate material, and a weather strip 17 is fitted therein. As shown in FIG. 1, the door sash 10 has an overlapping section 11 formed by making plate materials overlap each other, a tubular section 13 formed to extend from a car-interior-side end portion (an end portion in a direction of an arrow X) of the overlapping section 11, and flange sections 14 and 15 respectively formed to protrude from a car-exterior-side end portion (an end portion in a direction of an arrow Y) of the overlapping section 11 to both sides. Further, the periphery of an end portion of a plate material 19c extending from the tubular section 13 is formed so as to come into contact along a plate material 19b forming the overlapping section 11 on the side on which the weather strip 17 is fitted, and the vicinity of an end portion 12 of the plate material 19b forming the overlapping section 11, in which deformation has occurred during roll-forming, protrudes to the inside of the tubular section 13.

The overlapping section 11 is configured of a first overlapping section 11a in which the plate materials 19a and 19b doubly overlap each other, and a second overlapping section 11b in which the plate materials 19a, 19b, and 19c triply overlap each other. Specifically, the first overlapping section 11a has a configuration in which the plate material 19a which extends so as to be connected from the flange section 14 protruding laterally on the side on which the window glass W is disposed, to the tubular section 13, and the plate material 19b which extends toward the tubular section 13 from the flange section 15 protruding laterally on the side on which the weather strip 17 is fitted overlap each other. The second overlapping section 11b is formed by making a holder 16 which extends toward the flange section 15 from the tubular section 13 and in which the periphery of a tip portion is bent in a substantially dogleg shape additionally overlap the plate material 19a and the plate material 19b.

Further, the vicinity of the end portion 12 of the plate material 19b forming the second overlapping section 11b protrudes to the inside of the tubular section 13. Here, in general, in a case where a door sash is formed by roll-forming a single plate material, including the door sash 10 of the first embodiment, in order to prevent displacement of the plate material in a width direction, guides are provided on both sides in the width direction of the plate material. Then, when the plate material is transported to forming rolls, there is a case where both end portions of the plate material are slightly deformed due to the contact thereof with the guides. If a predetermined place of the second overlapping section 11b is welded (refer to W1 shown in FIG. 3) by laser-welding or the like after the roll-forming in a state where the plate material deformed in the vicinity of the end portion 12 does not protrude to the inside of the tubular section 13, an end portion 12a deformed as shown in FIG. 3 comes into contact with the other plate materials 19a and 19c configuring the second overlapping section 11b, whereby a gap S is generated, and thus the close contact between the welded surfaces in the overlapping section 11 decreases.

Therefore, in the first embodiment, the vicinity of the end portion 12 of the plate material 19b, in which deformation has occurred during the roll-forming, protrudes to the inside of the tubular section 13, whereby even if welding is continuously performed by continuous seam welding, laser-welding, or the like without spacing in the longitudinal direction of the door sash 10, that is, in the direction perpendicular to FIG. 1, the vicinity of the end portion 12 of the plate material 19b does not come into contact with the plate materials 19a and 19c configuring the second overlapping section 11b. Accordingly, no gap is formed between the plate materials 19a, 19b, and 19c, and therefore, the close contact between the welded surfaces can be improved. It is preferable that the vicinity of the end portion 12 of the plate material 19b forming the second overlapping section 11b does not protrude further toward the inside of the tubular section 13 than the inner surface of the plate material of the tubular section 13, which forms a corner portion along with the second overlapping section 11b. That is, it is favorable if the width dimension of the metal strip is set in consideration of the dimension of the vicinity of the end portion 12 of the plate material 19b corresponding to an amount protruding to the inside of the tubular section 13.

The tubular section 13 is formed in a substantially D-shape when viewed in a cross section. A glass channel (not shown) is fitted between the tubular section 13 and the flange section 14. On the other hand, the weather strip 17 is provided on the flange section 15 side. The weather strip 17 has a recess portion 17a formed on the side on which the weather strip 17 comes into contact with the flange section 15, and a recess portion 17b formed on the side on which the weather strip 17 comes into contact with the overlapping section 11. By the recess portion 17a being fitted to a projection portion 15a formed to protrude at the flange section 15 and the recess portion 17b being fitted to the holder 16, the weather strip 17 is fixed to the door sash 10.

[Method for Manufacturing Door Sash of First Embodiment]

Next, a method for manufacturing the door sash 10 of the first embodiment will be described hereinafter. In general, in a case where a door sash is formed by roll-forming a single plate material, in order to prevent displacement of the plate material in the width direction, guides are provided on both sides in the width direction of the plate material. Then, the plate material is transported to the forming rolls while both end portions of the plate material come into contact with the guides.

A metal strip which is a single plate material is passed between plural sets of forming rolls, thereby being roll-formed into a cross-sectional shape shown in FIG. 2. At that time, the roll-forming is performed such that the vicinity of the end portion 12 of the plate material 19b forming the overlapping section 11, in which deformation has occurred during the transport to the forming rolls, protrudes to the inside of the tubular section 13. It is more preferable if the vicinity of the end portion 12 of the plate material 19b forming the second overlapping section 11b does not protrude further toward the inside of the tubular section 13 than the inner surface of the plate material of the tubular section 13, which forms a corner portion along with the second overlapping section 11b. The amount of protrusion of the vicinity of the end portion 12 of the plate material 19b to the inside of the tubular section 13 is minimized, whereby it is possible to reduce the width dimension of the metal strip, and thus it is possible to reduce the weight of the entire door sash 10. Here, in a case of performing the roll-forming without making the vicinity of the end portion 12 of the plate material 19b protrude to the inside of the tubular section 13, due to the deformed area generated in the vicinity of the end portion 12 of the plate material 19b coming into contact with the plate material 19a or the plate material 19c, a gap is generated, and thus the close contact between the welded surfaces decreases. Therefore, before the roll-forming is carried out, it is necessary to correct the deformation into a shape in which a gap does not occur, by performing press working so as to grip the deformed area generated in the vicinity of the end portion 12 of the plate material 19b from both width directions.

At the final stage of the roll-forming, the plate material 19c configuring the tubular section 13 is gradually bent, as shown by a two-dot chain line of FIG. 2, and is disposed so as to come into contact with the vehicle main body B side of a part of a section in which the plate materials 19a and 19b respectively extending from the flange sections 14 and 15 on both sides overlap each other by bending the plate material 19c configuring the tubular section 13 at a middle portion thereof. With this disposition, the first overlapping section 11a in which the plate material 19a and the plate material 19b doubly overlap each other, and the second overlapping section 11b in which the plate material 19a, the plate material 19b, and the plate material 19c triply overlap each other, are configured. The periphery of a tip portion of the plate material 19c is bent into a substantially dogleg shape, thereby forming the holder 16.

Then, the second overlapping section 11b is continuously welded by continuous seam welding, laser-welding, or the like along the longitudinal direction of the door sash 10, that is, in the direction perpendicular to FIG. 1. In this embodiment, the vicinity of the end portion 12 of the plate material 19b protrudes to the inside of the tubular section 13. Therefore, even if welding is performed by continuous seam welding, laser-welding, or the like, since the vicinity of the end portion 12 of the plate material 19b does not come into contact with the plate material 19a or the plate material 19c configuring the second overlapping section 11b, no gap is formed between the plate materials 19a, 19b, and 19c, and thus it is possible to improve the close contact between the welded surfaces in the overlapping section 11.

It is preferable if the welded place is welded at a predetermined place of the second overlapping section 11b close to the center of gravity of a cross section orthogonal to the longitudinal direction of the door sash 10. The cross-sectional center of gravity of a cross section orthogonal to the longitudinal direction of the door sash 10 can be calculated in advance by using CAD software or the like such as Auto-CAD. Due to being welded at a place close to the cross-sectional center of gravity, bending work for forming the curved shape of the door sash 10 becomes easy and the accuracy of the bending work is improved.

Thereafter, a glass channel (not shown) is fitted and mounted between the tubular section 13 and the flange section 14, and the weather strip 17 is fixed to the door sash 10 by fitting the recess portion 17a of the weather strip 17 to the projection portion 15a formed to protrude at the flange section 15 and fitting the recess portion 17b of the weather strip 17 to the holder 16.

[Effects of Door Sash of First Embodiment]

In the door sash 10 of the first embodiment, the gap 8 formed in the door sash 1 of the related art is not formed, and therefore, a configuration in which water does not penetrate between the plate materials 19a and 19b of the overlapping section 11 is made, and thus the occurrence of rust can be prevented.

Further, in the door sash 10 of the first embodiment, since the vicinity of the end portion 12 of the plate material 19b, in which deformation has occurred during the transport to the forming rolls, does not come into contact with the plate material 19a or the plate material 19c configuring the second overlapping section 11b and no gap is formed between the plate materials 19a, 19b, and 19c, it is possible to improve the close contact between the welded surfaces. Further, in the door sash 10 of the first embodiment, even if deformation occurs in the vicinity of the end portion 12 of the plate material 19b, the vicinity of the end portion 12 of the plate material 19b does not come into contact with the plate material 19a or the plate material 19c configuring the second overlapping section 11b, and it is unnecessary to perform working for correcting the deformation of the vicinity of the end portion 12 of the plate material 19b before the roll-forming is performed, and thus a working cost can be reduced.

Further, in the door sash 10 of the first embodiment, the vicinity of the end portion 12 of the plate material 19b forming the second overlapping section 11b does not protrude further toward the inside of the tubular section 13 than the inner surface of the plate material of the tubular section 13, which forms a corner portion along with the second overlapping section 11b, and therefore, the amount of protrusion of the vicinity of the end portion 12 of the plate material 19b to the inside of the tubular section 13 can be minimized, whereby it is possible to reduce the width dimension of the metal strip, and thus it is possible to reduce the weight of the entire door sash 10.

Further, in the door sash 10 of the first embodiment, bending work for forming the curved shape of the door sash 10 becomes easy and the accuracy of the bending work is improved.

[Configuration of Door Sash of Second Embodiment]

Next, a door sash according to a second embodiment of the present invention will be described in detail based on the accompanying drawings. FIG. 5(a) is a cross-sectional view of the door sash according to the second embodiment of the present invention, and FIG. 5(b) is a cross-sectional view showing a state where a weather strip is mounted on the door sash shown in FIG. 5(a).

A door sash 20 of the second embodiment has the same configuration as the door sash 10 of the first embodiment except for the following point. The door sash 20 of the second embodiment is different from the door sash 10 of the first embodiment in that the door sash 20 does not have a configuration corresponding to the holder 16 of the first embodiment. In the following description, identical or corresponding parts to those of the first embodiment are denoted by identical or corresponding reference numerals, and thus the explanation thereof is omitted or simplified, and only the differences will be described in detail.

In the door sash 20 of the second embodiment, there is no configuration corresponding to the holder 16 of the first embodiment, and a weather strip 27 has a recess portion 17a which is fitted to the projection portion 15a formed to protrude at the flange section 15, and is fixed to the tubular section 13 by a mounting clip 28.

[Method for Manufacturing Door Sash of Second Embodiment]

In a method for manufacturing the door sash 20 of the second embodiment, the door sash 20 is manufactured through substantially the same steps as those in the method for manufacturing the door sash 10 of the first embodiment described above, and therefore, the detailed description thereof is omitted.

[Effects of Door Sash of Second Embodiment]

In the door sash 20 of the second embodiment, a holder for being fitted to the weather strip 27 is not formed, and therefore, it is possible to attain a reduction in weight by an amount corresponding to the holder and a reduction in material cost.

Further, in the door sash 20 of the second embodiment, since the end portion 12 of the plate material 19b does not come into contact with the plate material 19a or the plate material 19c configuring the second overlapping section 11b and no gap is formed between the plate materials 19a, 19b, and 19c, it is possible to improve the close contact between the welded surfaces. In the door sash 20 of the second embodiment, even if deformation occurs in the vicinity of the end portion 12 of the plate material 19b, the vicinity of the end portion 12 of the plate material 19b does not come into contact with the plate material 19a or the plate material 19c configuring the second overlapping section 11b, and it is unnecessary to perform working for correcting the deformation of the vicinity of the end portion 12 of the plate material 19b before the roll-forming is performed, and thus a working cost can be reduced. Further, in the door sash 20 of the second embodiment, bending work for forming the curved shape of the door sash 20 becomes easy and the accuracy of the bending work is improved.

[Modification Example and the Like of Embodiment]

The invention disclosed in this specification includes, in addition to the configuration of each invention or embodiment, a configuration specified by changing partial configurations of the above configuration to other configurations disclosed in this specification, within an applicable range, a configuration specified by adding other configurations disclosed in this specification to the above configuration, or a configuration specified into a high-level concept by deleting partial configurations of the above configuration to the extent that a partial operation and effect can be obtained, and also includes the following modification example or the like.

As a modification example of this embodiment, there is a door sash 30 shown in FIG. 7. As shown in FIG. 7, a configuration provided with a stepped section 32 which extends from a car-interior-side end portion (an end portion in a direction of an arrow X) of an overlapping section 31 and is bent toward the side on which the window glass W is disposed (the lower side in FIG. 7), such that a step is formed, is also acceptable. Further, an end portion 36a of a plate material 39c is formed at a position where the end portion 36a does not protrude further toward the side on which a weather strip 37 is fitted than a surface 311 of the overlapping section 31 and a surface 331 of a tubular section 33 on the side on which the weather strip 37 is fitted. Specifically, the end portion 36a is subjected to press working to a position where it does not protrude further toward the side on which the weather strip 37 is fitted than the surface 311 of the overlapping section 31 and the surface 331 of the tubular section 33. The deformation amount of the end portion 36a due to the press working is entirely absorbed by the deformation of the plate materials forming the stepped section 32, and therefore, a distortion or the like does not occur in the overlapping section 31 or the tubular section 33.

In the door sash 30, when the weather strip 37 is fitted into the door sash 30, the end portion 36a does not interfere with the weather strip 37, and thus the close contact between the weather strip 37 and the door sash 30 can be improved.

REFERENCE SIGNS LIST 10, 20, 30: door sash
11, 31: overlapping section
11a: first overlapping section
11b: second overlapping section
13, 33: tubular section
14, 15: flange section
15a: projection portion
16: holder
17, 27, 37: weather strip
17a, 17b: recess portion
19a, 19b, 19c, 39a, 39b, 39c: plate material
28: mounting clip
36a: end portion
100: vehicle door
101: door main body B: vehicle main body W: window glass

The invention claimed is:

1. A door sash which is formed by roll-forming from a single plate material and in which a weather strip is fitted, comprising:
    a first overlapping section having two layers of the plate material;
    a second overlapping section having three layers of the plate material;
    a tubular section formed to extend from a car-interior-side end portion of the first overlapping section; and
    flange sections respectively formed to protrude from a car-exterior-side end portion of the first overlapping section to both sides,
    wherein
    a periphery of an end portion of the plate material extending from the tubular section comes into contact along the plate material forming the first overlapping section on the side on which the weather strip is fitted, so as to form the second overlapping section therewith, and
    a vicinity of an end portion of the plate material forming the second overlapping section extends towards and inside the tubular section.

2. The door sash according to claim 1, wherein the vicinity of the end portion of the plate material does not protrude further toward the inside of the tubular section than an inner surface of the plate material of the tubular section, which forms a corner portion along with the second overlapping section.

3. The door sash according to claim 2, wherein the first overlapping section is welded at a place close to a center of gravity of a cross section orthogonal to a longitudinal direction of the door sash.

4. The door sash according to claim 3, further comprising:
    a stepped section which extends from the car-interior-side end portion of the second overlapping section and is bent toward the side on which a window glass is disposed, such that a step is formed,
    wherein an end portion of the plate material is formed at a position where the end portion does not protrude further toward the side on which the weather strip is fitted than a surface of the first overlapping section and a surface of the tubular section on the side on which the weather strip is fitted.

5. The door sash according to claim 2, further comprising:
    a stepped section which extends from the car-interior-side end portion of the second overlapping section and is bent toward the side on which a window glass is disposed, such that a step is formed,
    wherein an end portion of the plate material is formed at a position where the end portion does not protrude further toward the side on which the weather strip is fitted than a surface of the first overlapping section and a surface of the tubular section on the side on which the weather strip is fitted.

6. The door sash according to claim 1, wherein the first overlapping section is welded at a place close to a center of gravity of a cross section orthogonal to a longitudinal direction of the door sash.

7. The door sash according to claim 6, further comprising:
    a stepped section which extends from the car-interior-side end portion of the second overlapping section and is bent toward the side on which a window glass is disposed, such that a step is formed,
    wherein an end portion of the plate material is formed at a position where the end portion does not protrude further toward the side on which the weather strip is fitted than a surface of the first overlapping section and a surface of the tubular section on the side on which the weather strip is fitted.

8. The door sash according to claim 1, further comprising:
    a stepped section which extends from the car-interior-side end portion of the second overlapping section and is bent toward the side on which a window glass is disposed, such that a step is formed,
    wherein an end portion of the plate material is formed at a position where the end portion does not protrude further toward the side on which the weather strip is fitted than a surface of the first overlapping section and a surface of the tubular section on the side on which the weather strip is fitted.

* * * * *